United States Patent [19]

Farr

[11] Patent Number: 5,262,704
[45] Date of Patent: Nov. 16, 1993

[54] PROTECTION CIRCUIT IN INVERTER FOR REFRIGERATORS

[75] Inventor: James B. Farr, Ann Arbor, Mich.

[73] Assignee: Tecumseh Products Company, Tecumseh, Mich.

[21] Appl. No.: 970,990

[22] Filed: Nov. 2, 1992

Related U.S. Application Data

[63] Continuation of Ser. No. 747,730, Aug. 20, 1991, abandoned, which is a continuation-in-part of Ser. No. 665,024, Mar. 5, 1991, abandoned.

[51] Int. Cl.⁵ ............................................. H02P 7/00
[52] U.S. Cl. ..................................... 318/434; 361/23; 307/80; 318/441
[58] Field of Search ................... 318/434, 798-806; 388/903, 934; 361/23, 24, 22, 29, 30, 31, 33, 94, 103; 323/282; 307/64-68, 80, 82; 363/50, 55, 56

[56] References Cited

U.S. PATENT DOCUMENTS

| | | | |
|---|---|---|---|
| 3,700,914 | 10/1972 | Granieri et al. | 307/141 |
| 3,875,483 | 4/1975 | Farr | 62/213 |
| 3,950,691 | 4/1976 | Ohba | 321/11 |
| 3,974,660 | 8/1976 | Farr | 62/229 |
| 4,320,448 | 3/1982 | Okuda et al. | 363/134 |
| 4,499,534 | 2/1985 | Schnetzka et al. | 363/129 |
| 4,517,636 | 5/1985 | Uchino et al. | 363/138 |
| 4,587,605 | 5/1986 | Kouyama et al. | 363/41 |
| 4,602,484 | 7/1986 | Bendikson | 62/158 |
| 4,621,316 | 11/1986 | Uesugi | 363/132 |
| 4,636,928 | 1/1987 | Deguchi et al. | 363/41 |
| 4,663,942 | 5/1987 | Kanazawa | 62/227 |
| 4,698,744 | 10/1987 | Itani et al. | 364/140 |
| 4,701,690 | 10/1987 | Fernandez et al. | 322/28 |
| 4,709,317 | 11/1987 | Iizuka et al. | 363/37 |
| 4,734,634 | 3/1988 | Kito et al. | 318/778 |
| 4,738,118 | 4/1988 | Kanazawa | 62/215 |
| 4,758,938 | 7/1988 | Kanazawa | 363/41 |
| 4,807,103 | 2/1989 | Uesgui | 363/41 |
| 4,849,950 | 7/1989 | Sugiura et al. | 363/48 |
| 4,860,185 | 8/1989 | Brewer et al. | 363/41 |
| 4,947,311 | 8/1990 | Peterson | 363/124 |

Primary Examiner—Jonathan Wysocki
Attorney, Agent, or Firm—Baker & Daniels

[57] ABSTRACT

The present invention is an inverter for a portable refrigerator. The inverter includes a square wave generator operable by a DC voltage source. A timer is also included which, in conjunction with the square wave generator, provides a multiple phase waveform for operating a compressor motor. For conventional three winding compressor motors, the inverter provides a six-step waveform for operation of the portable refrigerator. The inverter can also drive the motor using either a first or second DC voltage level, by minor changes in the inverter and using either a wye or delta winding configuration. The inverter also includes a protection circuit which protects against locked rotor and overload current conditions, as well as a shut-off circuit to guard against operating at low speeds and completely draining the battery.

43 Claims, 9 Drawing Sheets

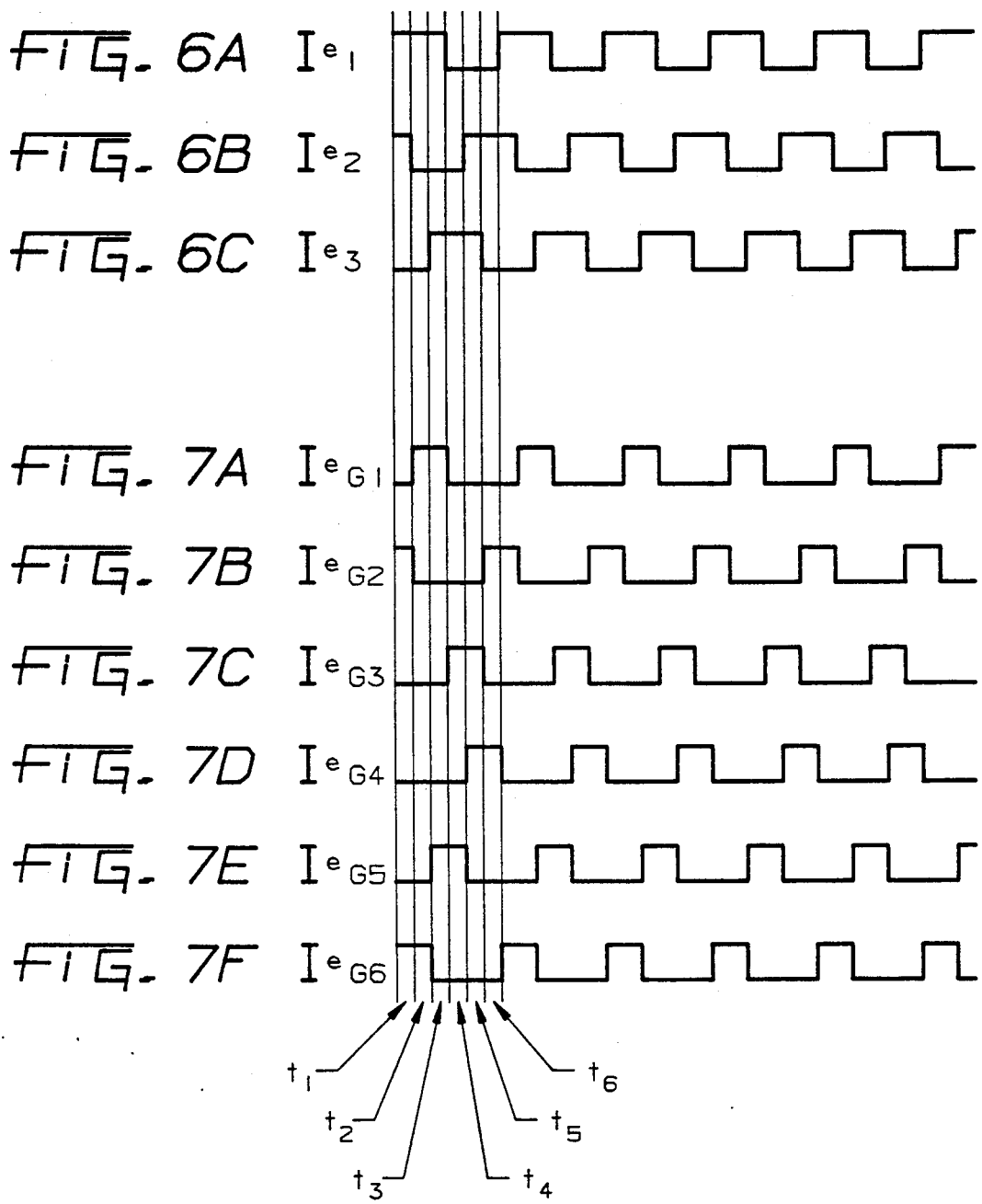

PROTECTION CIRCUIT IN INVERTER FOR REFRIGERATORS

This is a continuation of application Ser. No. 07/747,730, filed Aug. 20, 1991, which is a continuation-in-part of application Ser. No. 07/665,024, filed Mar. 5, 1991 now abandoned.

BACKGROUND OF THE INVENTION

1. Field of the Invention

The present invention relates to portable refrigerators. More specifically, the field of the invention is that of locked rotor detection and burnout protection circuit in inverters for the motors of portable refrigerators.

2. Prior Art

Portable refrigerators are known which operate on battery power to drive the compressor motor. The motors are driven by inverters having a fixed frequency and one or three phases. Problems with the prior art inverters are that they may not perform well during the motor start-up and that they may not run at a high level of efficiency.

What is needed is an inverter for a portable refrigerator which performs well during motor start-up.

Another need is for an inverter which is more efficient.

SUMMARY OF THE INVENTION

The present invention provides an inverter for a portable refrigerator which produces a multiple phase electric current to power the windings of the refrigerator compressor. A battery supplies the electric power to the compressor windings via the inverter. The inverter provides a pulse train having a frequency which is proportional to the input voltage. The circuitry producing the pulse train includes a square wave generator driven by a timing circuit. The square wave generator is connected to additional circuitry which provides a six step waveform to the compressor windings.

The inverter of the present invention also includes current limiting circuitry which terminates operation of the compressor windings if excessive or insufficient current is provided. This prevents operation of the compressor at a speed too low to pump lubricating oil within the compressor. Also, the output transistors are protected from damage from excessive current. Further, the inverter has cut-off circuitry which does not allow the battery to completely discharge because the cut-off circuit senses battery fatigue and disconnects the inverter from the battery. The cut-off circuit then re-enables the inverter after a predetermined delay, for example, five minutes.

The present invention also includes protection circuitry for the detection of a locked rotor condition and for protection against burnout from the shorting of the output terminals. In one embodiment, two voltage comparators a low resistance sense resistor operate to detect the existence of excessively high power transistor current and stop the operation of the inverter when excessive current is detected. In a second embodiment, the protection circuitry includes a transistor associated with each power transistor and combinations of a resistance and another transistor sensitive to locked rotor or shorted current. The second embodiment provides a savings over the use of voltage comparators and a sense resistor in terms of the cost of fabrication and the efficiency of the inverter. The second embodiment simultaneously turns-off all six power transistors during fault protection for shorting phase-to-phase of the output terminals and for phase-to-ground.

Typical battery voltages for portable refrigerators are 12 volts (V) or 24 V. The inverter of the present invention allows for using the same motor with both battery voltages. In addition, the structure of the inverter is quickly and easily convertible between running on the 12 V and 24 V battery. By making a slight modification to the inverter and by changing the arrangement of the windings between a delta and a wye configuration, either 12 V or 24 V batteries may be used to provide power to the portable refrigerator.

The present invention is, in one form, a portable refrigerator which is adapted to be connected to a source of DC voltage, and comprises a housing, a compressor disposed within the housing, a motor operably connected to the compressor, and an inverter for driving the motor. The inverter is adapted to be coupled to the DC voltage source, and includes a device for generating a multiple phase AC output voltage from the DC voltage source and providing the multiple phase AC output voltage to the motor. The inverter further includes a device responsive to the amplitude of the DC voltage source which provides the multiple phase AC output voltage at a frequency proportional to the amplitude of the DC voltage source.

One object of the present invention is to provide an inverter for a portable refrigerator which performs well during motor start-up.

Another object is to provide an inverter which is more efficient.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIGS. 6A-6C are graphs of the idealized square waveforms produced by the three phase square waveform generator of the present invention.

FIGS. 7A-7F are graphs of the idealized gate waveforms produced by the six step drive waveform generator of the present invention.

Figure 1A:
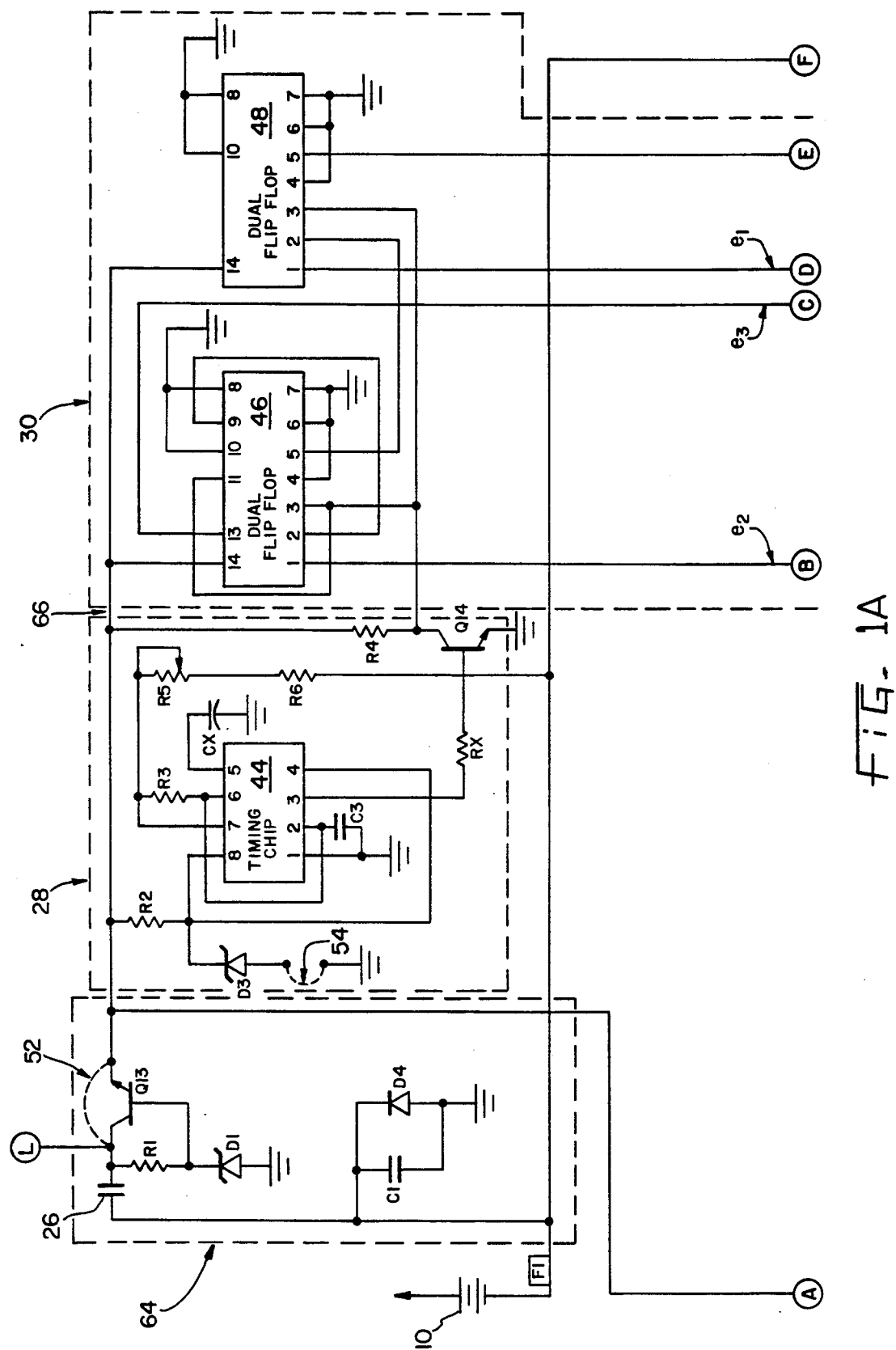
FIGS. 1A, 1B, and 1C are circuit diagrams of a first embodiment of the inverter of the present invention.

Corresponding reference characters indicate corresponding parts throughout the several views. The exemplifications set out herein illustrate preferred embodiments of the invention, in various forms, and such exemplifications are not to be construed as limiting the scope of the invention in any manner.

DESCRIPTION OF THE PREFERRED EMBODIMENT

Figure 3:
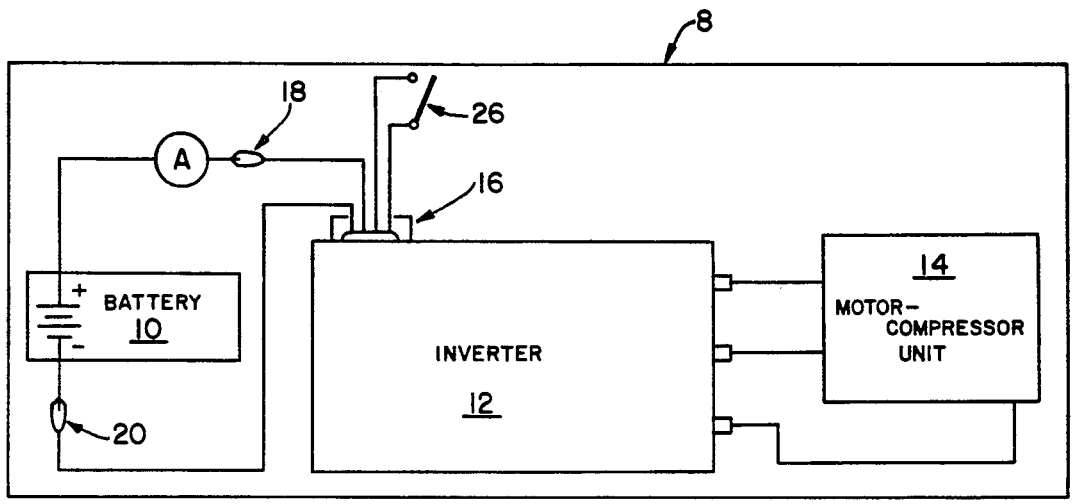
FIG. 3 is a schematic diagram of the portable refrigerator of the present invention.

The present invention relates to portable refrigerator 8 as shown in FIG. 3. Portable refrigerator 8 includes battery 10 for supplying direct current to inverter 12 which drives motor-compressor unit 14. Battery 10 may be a 24 V, 50 Amp-hr battery or a 12 V, 100 Amp-hr battery as described below. Alternatively, another type of power supply could be used, such as a vehicle alternator, or an alternating current source which is rectified and filtered to provide direct current. Motor-compressor unit 14 includes a compressor for compressing refrigerant and a three phase electric motor for driving the compressor.

Figure 4:
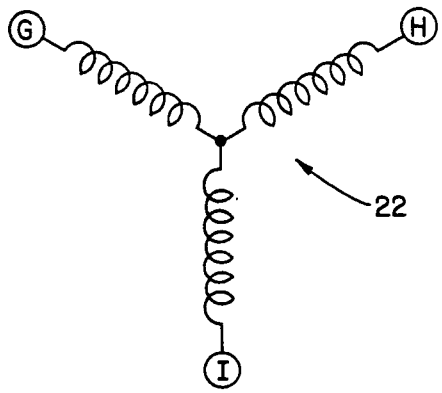
FIG. 4 is a circuit diagram of the motor windings in a wye configuration.
Figure 5:
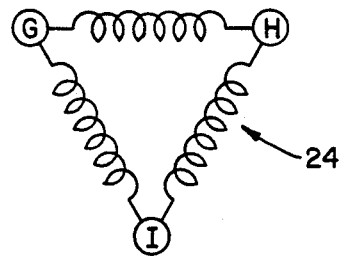
FIG. 5 is a circuit diagram of the motor windings in a delta configuration.

In accordance with the present invention, inverter 12 includes a three phase inverter for supplying current for the electric motor of motor-compressor unit 14, with the circuitry of inverter 12 being described in greater detail below. Battery 10 and inverter 12 are electrically coupled via fuse holder 16 of inverter 12, with clips 18 and 20 located on the electrical lines connected to battery 10. Inverter 12 is drivingly connected to the three phase motor of unit 14 which may have windings 22 in the wye configuration as shown in FIG. 4 for operation with a 24 V battery, or windings 24 in the delta configuration as shown in FIG. 5 for operation with a 12 V battery.

Figure 1B:
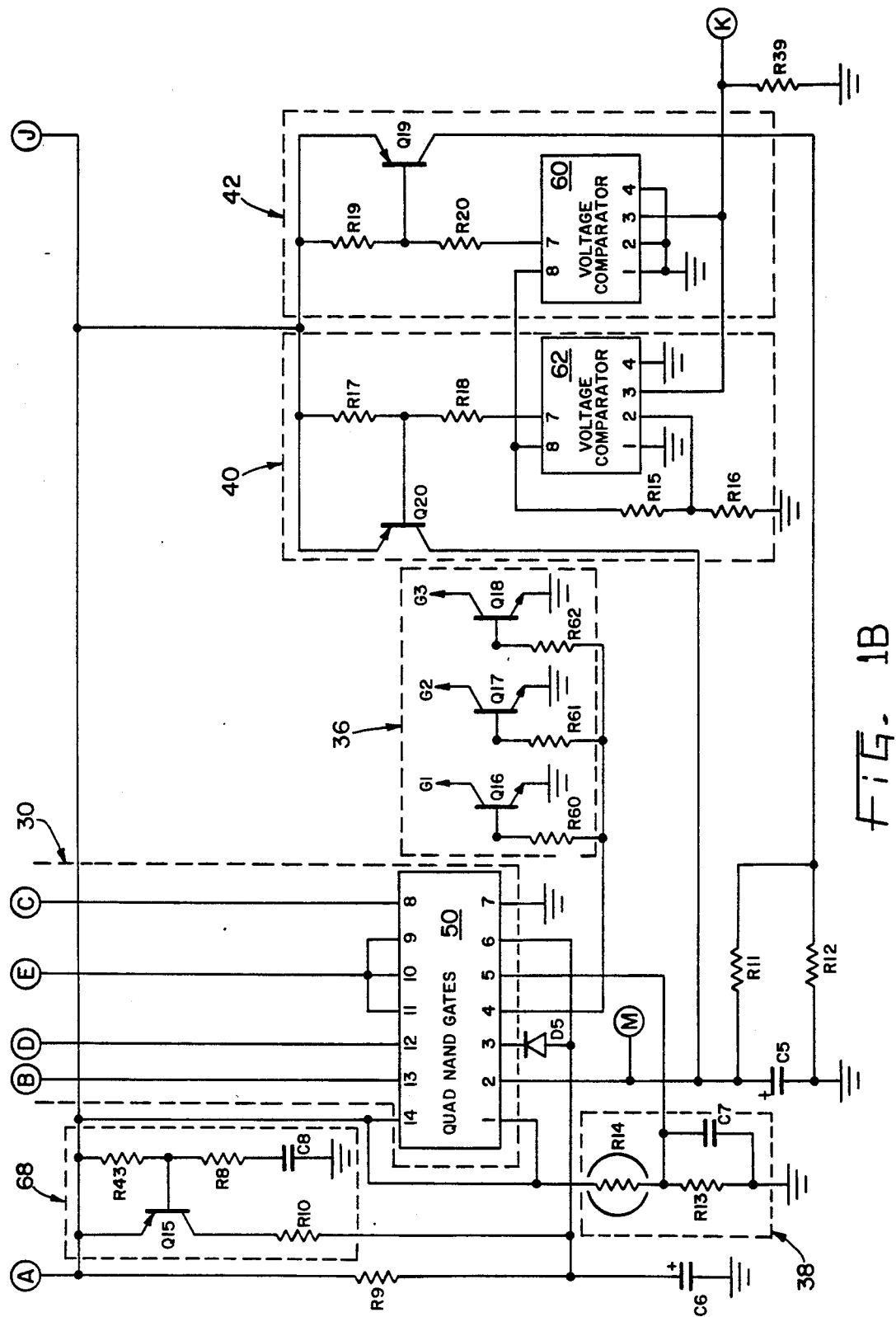
Figure 1C:
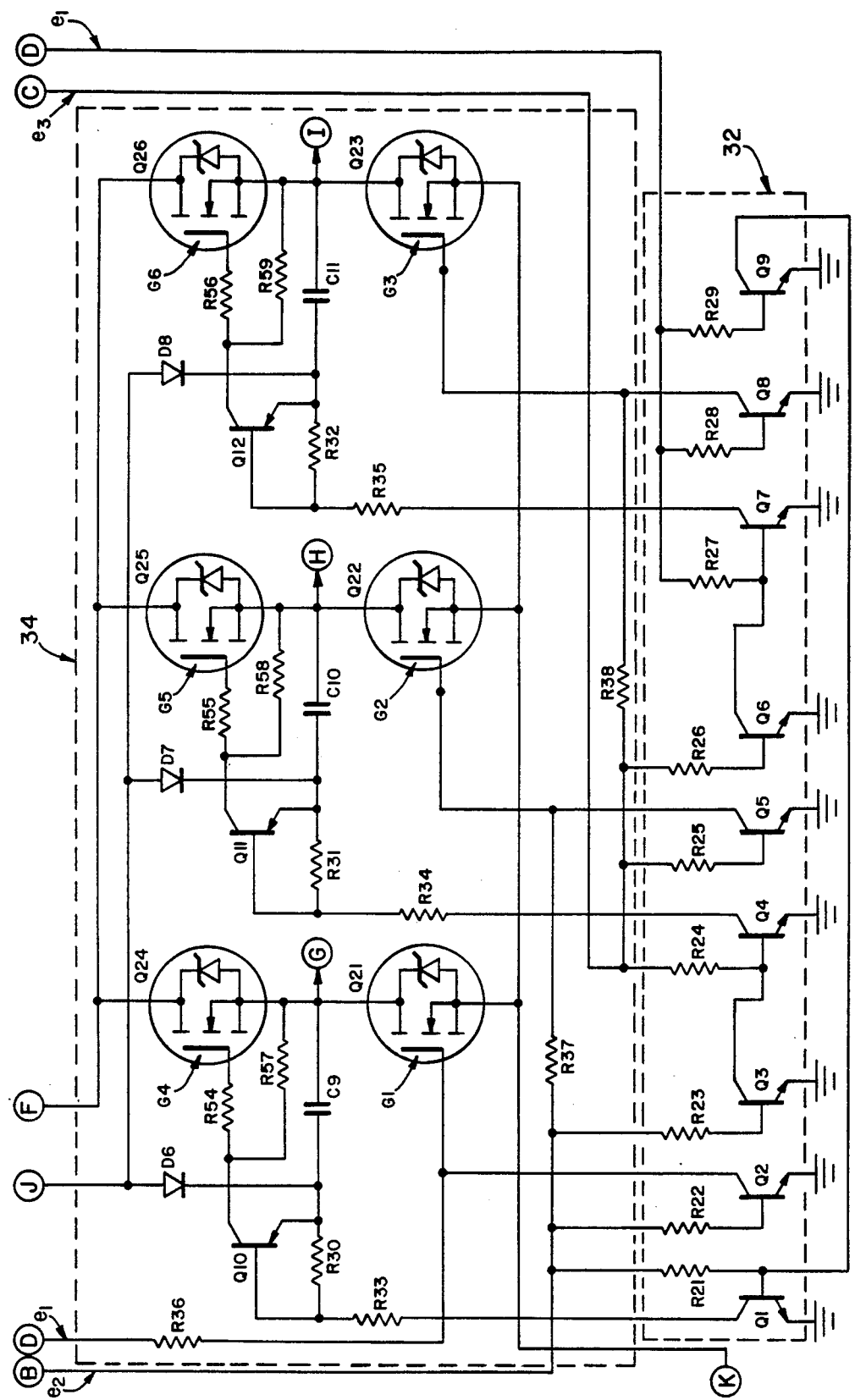

The first embodiment of inverter 12 is shown in detail in the circuit diagram of FIGS. 1A, 1B, and 1C. Inverter 12 includes cold control thermostat contacts 26, timer 28, square wave generator 30, decoder circuit 32, and power transistors 34 which are connected at terminals G, H, and I having the arrangement of either windings 22 or 24. Cold control 26 may be a thermostat or other device for turning portable refrigerator 6 on and off, and is connected to battery 10 to start or stop the drive circuits 28, 30, and 32 of inverter 12. Timer 28 provides timing signals to square wave generator 30 so that six square waveform signals are provided to decoder 32 which drives power transistors 34 and thereby producing a six step waveform at the inverter output terminals G, H, and I. Three of the square waveform signals appear on lines labeled $e_1$, $e_2$, and $e_3$; the other three are the complements of those signals, namely $\overline{e_1}$, $\overline{e_2}$, and $\overline{e_3}$. The details of the inverter circuitry is described in greater detail below.

To protect inverter 12 from potentially damaging conditions, de-energizing transistors 36 are connected to and are capable of disabling power transistors 34. Thermal overload circuit 38, overload circuit 40, and locked rotor circuit 42 are capable of triggering de-energizing transistors 36 in case of a fault condition (i.e., overheating, insufficient voltage, excess electrical load, etc.) as described in further detail below.

In operation, inverter 12 provides a six step waveform which is proportional in magnitude and in frequency to the input voltage from battery 10. This is provided by holding the voltage constant at one input of a comparator of timing chip 44 of timer 28 while a timing capacitor connected to timing chip 44 charges from the variable battery voltage through resistors R3, R5, and R6. Timing chip 44 thereby provides a pulse train, with a frequency proportional to the input battery voltage, to square wave generator 30.

Dual flip flops 46 and 48 and two NAND gates of quad NAND gates 50 form square wave generator 30 which provides a three phase square wave output to decoder 32. The three square wave signals (the signals $e_1$, $e_2$, and $e_3$ which are shown in FIGS. 6A-6C) are provided to NPN transistors Q1-Q9 of decoder 32, which drive gates G1-G3 of power MOSFET transistors Q21-Q23 and the bases of PNP transistors Q10-Q12 of power transistors 34. The collectors of Q10-Q12 drive gates G4-G6 of power MOSFET transistors Q24-Q26.

With this arrangement, the waveforms which occur at gates G1-G6 (see FIGS. 7A-7F) are logical functions of two of the signals $e_1$, $e_2$, and $e_3$, wherein equations (1)-(6) define the relationships, with $e_{G1}$ being the state of gate G1, etc.:

$$e_{G1} = e_1 \cdot \overline{e_2} \tag{1}$$

$$e_{G2} = e_2 \cdot \overline{e_3} \tag{2}$$

$$e_{G3} = e_3 \cdot \overline{e_1} \tag{3}$$

$$e_{G4} = e_2 \cdot e_1 \tag{4}$$

$$e_{G5} = e_3 \cdot e_2 \tag{5}$$

$$e_{G6} = e_1 \cdot e_3 \tag{6}$$

For example, lower power transistor Q22 has its gate G2 coupled via resistor R37 to line B which carries the signal for $e_2$, and is also coupled to the collector of transistor Q5. The base of Q5 is coupled to line C which carries the signal for $e_3$, with the emitter of Q5 being coupled to ground. Therefore, if $e_3$ is high, then the base of Q5 will conduct and draw gate G2 to ground. Thus, G2 is only high when $e_2$ is high and $e_3$ is low as defined in equation (2). Lower power transistors Q21 and Q23 have similar arrangements according to equations (1) and (3), respectively.

For each upper power transistor, Q24-Q26, an additional driving transistor, Q10-Q12 respectively, is provided. For example, gate G5 is coupled to the collector of PNP transistor Q11 which drives transistor Q25. The base of Q11 is coupled via resistor R34 to the collector of NPN transistor Q4, with Q4 having its emitter coupled to ground. The base of Q4 is coupled via resistor R24 to line C which carries the signal $e_3$, and to the collector of transistor Q3 which has its base coupled via resistor R23 to line B which carries the signal $e_2$. Therefore, if $e_3$ is high, then the base of Q4 will conduct and cause a current flow through Q11 and have a high voltage apparent at G5. However, in this situation if $e_2$ goes high, then Q3 will conduct and draw the base of Q4 low and prevent current flow through Q11. Thus, G5 is only high when $e_2$ is low and $e_3$ is high as defined in equation (5). Upper power transistors Q24 and Q26 have similar arrangements according to equations (4) and (6), respectively.

During time period $t_1$, G6 and G2 are high and close power transistors Q26 and Q22. This closes a circuit between terminal I and terminal H wherein the current flows from I to H (or I→H). The next time period $t_2$, G6 and G1 are high and close transistors Q26 and Q21. This closes a circuits between terminal I and terminal G (or I→G). Similarly for periods $t_3$-$t_6$ a circuit between two of terminals G, H, and I is formed, so that the resulting effect is a six phase current having the pattern described in the following TABLE 1:

TABLE 1

| time period | current flow |
|---|---|
| t₁ | I → H |
| t₂ | I → G |
| t₃ | H → G |
| t₄ | H → I |
| t₅ | G → I |
| t₆ | G → H |

The gate voltage state waveforms shown in FIGS. 7A-7F could also have been produced by circuitry utilizing logic gates rather than transistors Q1-Q9 of decoder 32 and the associated resistors. An advantage of the disclosed structure over logic gate circuitry is that transistors Q1, Q4, and Q7 can withstand the high voltage required to drive upper power transistors Q10-Q12 and their associated circuitry. In the 24 V configuration, the drive voltage may be up to 40 V, and in the 12 V configuration up to 26 V.

The windings of motor-compressor unit 14 can be operated by inverter 12 as described above with battery 10 being either a 12 V or 24 V battery. In the configuration of inverter 12 using a 12 V battery, jumpers 52 and 54 are attached to the circuitry of inverter 12 as shown in FIG. 1A. Jumper 52 connects the collector and emitter of transistor Q13, thus effectively eliminating Q13 from the active circuitry of cold control 26. Jumper 54 connects the anode of Zener diode D3 with ground. Also, the 12 V configuration uses resistor R39 which is a sensor wire comprising an eight inch length of AWG No. 17 copper wire (having a resistance of 3.5 mΩ). The windings are arranged in the delta configuration of windings 24 shown in FIG. 5.

In the configuration of inverter 12 using a 24 V battery, jumpers 52 and 54 are not used in the circuitry of inverter 12. Transistor Q13 thus remains in the active circuitry of cold control 26. Zener diode D3 is not connected to ground and is effectively eliminated from the active circuitry of timer 28. Also, the 24 V configuration uses resistor R39 which is a sensor wire comprising an eight inch length of AWG No. 20 copper wire (having a resistance of 7 mΩ). The windings are arranged in the wye configuration of windings 22 shown in FIG. 6.

In accordance with the present invention, motor-compressor unit 14 can be driven by a 12 V or 24 V power source conventionally provided by battery 10. With inverter 12 of the present invention, delta configuration windings 24 have almost no circulating current. Circulating current in the delta configuration would tend to cause the performance of motor-compressor unit 14 to be worse than when using wye configuration windings 22. However, motor-compressor unit 14 performs equally well with the 12 V or 24 V configuration, and therefore inverter 12 of the present invention provides a design which can be used in portable refrigerators having different power supplies with minimal adaptation.

Figure 2:
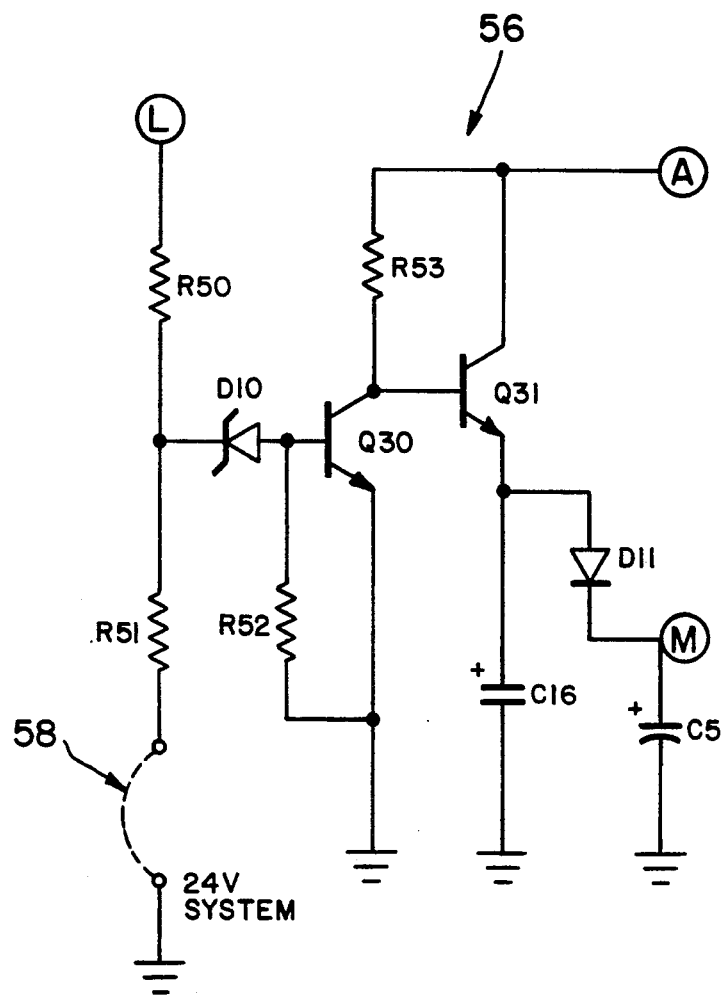
FIG. 2 is a circuit diagram of low voltage cutout circuitry.

In addition, the present invention provides low voltage cut-out circuit 56 as shown in FIG. 2. Circuit 56 works in conjunction with two NAND gates in Quad NAND gates 50 (the two NAND gates are represented by pins 1, 2, and 3, and 5, 6, and 4 of gates 50) to protect power transistors 34 against operation with an insufficient gate drive, to protect battery 10 against excess depletion, and to prevent operation of motor-compressor unit 14 below the rpm limit for oil pumping within unit 14. Although not necessary for the operation of inverter 12, low voltage cut-out circuit 56 provides the aforementioned protection from problems which may occur with a drained battery 10. Jumper 58 is included with circuit 56 when in the 24 V configuration to couple one terminal of resistor R51 to ground. In the 12 V configuration, jumper 58 is omitted from circuit 56 effectively removing R51 from the active circuitry.

In operation with the 24 V configuration having a fully charged battery 10, Zener diode D10 of circuit 56 conducts and turns on transistor Q30, thus turning off transistor Q31. However, when the input voltage from battery 10 drops below the cut-out voltage, for example, 14 V in the 24 V configuration or 7 V in the 12 V configuration, Q30 turns off and Q31 turns on which causes the voltages apparent on capacitors C16 and C5 to rise toward the positive signal bus voltage carried on line A. Pin 2 of gates 50 is coupled to circuit 56 by line M, and when the voltage apparent on line M reaches the trip point of pin 2 then output pin 3 drops to low. The low signal on output pin 3 of the first NAND gate of gates 50 causes the second NAND gate output pin 4 to go high. The high signal on output pin 4 turns on de-energizing transistors 36 which deactivate gates G1-G3 of power transistors Q21-Q23 and thus shuts off the output current of inverter 12. After the shut off of output current, capacitors C5 and C16 discharge through resistors R11 and R12 which causes the voltage apparent on pin 2 of gates 50 to drop below its threshold voltage, causing pin 3 to go high. Capacitor C6 is then able to charge through resistor R9. When the threshold at pin 6 is reached, pin 4 drops low thus restarting inverter 12.

Unless battery 10 is recharged during the time period that de-energizing transistors 36 are turned on, cut-out circuit 56 will again shut off output current. The length of the shut off time period is determined by the value of capacitors C5, C6, and C16, which in the exemplary embodiment provides a one minute shut off time period. To resume normal operation, battery 10 must be recharged to at least above the cut-out voltage, and preferably to a full charge of 12 V or 24 V. However, if battery 10 is not recharged, circuit 56 prevents inverter 12 from operating for any significant period of time, and thus little additional drain of battery 10 occurs.

The present invention also includes locked rotor circuit 42 which protects motor-compressor unit 14 from damage and battery 10 from excessive drainage caused by a locked rotor condition occurring at startup of unit 14. Rather than the usual practice of limiting the current provided to power transistors 34, circuit 42 limits the time duration and duty cycle of the stalled or locked rotor current, for instance allowing full voltage without any current limitation for a period of one second. The current of power transistors 34 is sensed by a low resistance, namely R39, which activates input pin 3 of voltage comparator 60 during the start cycle of motor-compressor unit 14.

When the voltage apparent on input pin 3 rises above the threshold voltage of comparator 60, output pin 7 of comparator 60 drops low and turns on the base of Q19. The collector of PNP transistor Q19 is coupled in parallel to one terminal of resistors R11 and R12, the other terminals of which are coupled to each terminal of capacitor C5. The other terminal of R12 is also coupled to ground, while the other terminal of R11 is also coupled to input pin 2 of gates 50. By this arrangement, capacitor C5 is ramp charged because of the conduction of transistor Q19.

If motor-compressor unit 14 starts within the usual start time, for example 0.5 seconds, the voltage at input pin 2 of gates 50 remains below the threshold necessary to trip the NAND gate of pin 2. However, if unit 14 does not start within a multiple of the usual start time then input pin 2 goes above the threshold so that output pin 3 drops low which forces input pin 6 low and output pin 4 high as described above. The high signal on output pin 4 turns on de-energizing transistors 36 which deactivate gates G1–G3 of power transistors Q21–Q23 and thus shuts off the output current of inverter 12. Input pin 6 slowly returns to a high state through resistor R9, after which inverter 12 is re-energized.

The present invention also includes overload circuit 40 which provides overload current protection to inverter 12. Overload current is typically caused by two of the terminals of the inverter being shorted together. The overload current is detected by comparator 62 which determines the difference between a predetermined threshold voltage and the voltage apparent at input pin 2 of gates 50 which is coupled to a terminal of R39. When an overload current is detected, output pin 7 of comparator 62 drops low and turns on the base of transistor Q20. The collector of PNP transistor Q20 is coupled to input pin 2 of gates 50 and to a terminal of capacitor C5. Transistor Q20 is a high current capacity signal level transistor. Q20 can thereby charge capacitor C5 quickly, for example 50 microseconds, which effectively protects power transistors 34 against shorting of the output terminals.

The present invention further provides inverter 12 with motor temperature protection by thermal overload circuit 38. The temperature of motor-compressor unit 14 is sensed by PTC resistor R14. During operation of unit 14 under typical temperatures, R14 remains at a low value so that the voltage apparent to input pin 5 of gates 50 remains high. However, upon the occurrence of an overheated condition, the resistance of PTC resistor R14 will increase to a greater value. At a predetermined temperature, for example 200° F., the resistance of R14 will cause the voltage apparent on input pin 6 of gates 50 to drop low, so that output pin 4 goes high and activates de-energizing transistors 36 thus shutting off the output current of inverter 12.

The remaining description provides additional detail into the structure and operation of the present invention. The circuitry is generally located on a single circuit board, although some of the components may have different physical locations. The terms used in this description, including the words "terminals" and "lines", are used to indicate electrical connections between the circuit components and not required physical structures.

Cold control 26 is disposed between battery 10 and timer 28, and activates inverter 12 to drive motor-compressor unit 14 with power supplied by battery 10. Specifically, one terminal of cold control 26 is coupled to the collector of transistor Q13 and the other terminal is coupled via fuse F1 to battery 10. Fuse F1 is preferably configured to burn out if the battery terminals are incorrectly attached. Cold control 26 may comprise a switch, and preferably comprises a thermostat with a switching device. Although battery 10 is directly connected to power transistors 34, inverter 12 cannot supply power to unit 14 until power regulating circuit 64 is enabled. Cold control 26 closes the connection between battery 10 and circuit 64 which then activates signal bus 66 and initiates the production of the square waveforms by timer 28 and generator 30.

Within circuit 64 is a voltage regulator formed by transistor Q13, resistor R1, and Zener diode D1. The collector of Q13 is coupled to cold control 26 and a terminal of R1, the base of Q13 is coupled to the other end of R1 and the cathode of Zener D1, and the emitter of Q13 is coupled to signal bus 66. When the voltage from cold control 26 exceeds a predetermined level then Zener D1 breaks down and D1 conducts from its anode to ground. In the 12 V configuration, jumper 52 is used and the current regulating circuitry is effectively eliminated from the active circuitry.

Timer 28 is coupled to signal bus 66 and includes timing chip 44 having pins 1–8, resistors R2–R6 and $R_x$, capacitors C3 and $C_x$, Zener diode D3, and transistor Q14. In the preferred embodiment, timing chip 44 comprises a standard integrated circuit chip designated NE555. Although a NE555 chip normally would supply a fixed pulse train frequency, the arrangement of timing chip 44 with Zener D3 and resistors R3, R5, and R6 provides the desired variable frequency. R2 has one terminal coupled to signal bus 66 and the other terminal coupled to pins 4 and 8 of chip 44. R3 has one terminal coupled to pins 6 and 2, with the other terminal coupled to pin 7 and a terminal of R5. R4 is coupled between signal bus 66 and the collector of Q14. R5 is a variable resistor coupled between R3 and R6. R5 is a 100K Ω potentiometer used as a variable resistor to set the inverter frequency. The exact setting of R5 is determined by the voltage and frequency requirements of the particular motor provided in motor-compressor unit 14. Typically, only a relatively small adjustment of R5 is required when switching between the 12 V and 24 V configuration. R6 is coupled between R5 and positive power bus line F. C3 has one terminal coupled to pins 2 and 6, with the other terminal coupled to pin 1 and ground. $C_x$ has one terminal coupled to pin 5, with the other terminal coupled to ground. D3 has a cathode coupled to R2 and pins 8 and 4. In the 12 V configuration, jumper 54 couples the anode of D3 to ground, but in the 24 V configuration the anode of D3 is unattached thus effectively removing D3 from the active circuitry of timer 28. Q14 is an NPN transistor having a base coupled to one terminal of $R_x$ which has its other terminal coupled to pin 3; an emitter coupled to ground; and a collector coupled to R4, pins 3 and 11 of dual flip flop 46, and pin 3 of dual flip flop 48. This exemplary arrangement provides a clock signal source to square wave generator 30.

Square wave generator 30 is coupled to timer 28 via Q14 and signal bus 66. Generator 30 comprises dual flip flop 46, dual flip flop 48, and quad NAND gates 50. Preferably, dual flip flop 46 and 48 each comprise a standard integrated circuit chip designated CD4013B. Generator 30 requires only three flip flops, so the second flip flop of dual flip flop 48 is unutilized. Each dual flip flop 46 and 48 has pin 14 coupled to signal bus 66 and pins 4, 6, 7, 8, and 10 coupled to ground. In dual flip flop 46, pin 1 provides signal $e_2$ over line B, pin 2 is coupled to pin 9, pins 3 and 11 are coupled to the collector of Q14, pin 5 is coupled to pin 2 of dual flip flop 48, and pin 13 provides signal $e_3$ over line C. In dual flip flop 48, pin 1 provides signal $e_1$ over line D, pin 3 is coupled to the collector of Q14, and pin 5 is coupled to pins 9, 10, and 11 of quad NAND gates 50.

Also, quad NAND gates 50 preferably comprises a standard integrated circuit chip designated CD4093B. Quad NAND gates 50 have pins 1 and 14 coupled via line A to signal bus 66 and pin 7 is coupled to ground. Generator 30 requires only two NAND gates, so only pins 8-13 of gates 50 are coupled to dual flip flops 46 and 48. In gates 50, pin 8 is coupled to line C and receives the signal $e_3$; pins 9, 10, and 11 are coupled to pin 5 of dual flip flop 48; pin 12 is coupled to line D and receives signal $e_1$; and pin 13 is coupled to line B and receives signal $e_2$. The other two NAND gates of gates 50 are pins 1-6 and are utilized in conjunction with other circuitry as described above.

Decoder circuit 32 and power transistors 34 are coupled to square wave generator 30 via lines B, C, and D which carry signals $e_2$, $e_3$, and $e_1$, respectively. Decoder 32 comprises NPN transistors Q1-Q9 and resistors R21-R29. Power transistors 34 comprise resistors R30-R38 and R54-R59; capacitors C9-C11; diodes D6-D8; PNP transistors Q10-Q12; and N-channel enhancement MOSFET transistors Q21-Q26 having gates G1-G6, respectively.

Line D, which carries signal $e_1$, is coupled to resistors R27-R29 and R36 to effect the state of gates G1, G3, G4, and G6. R36 is also coupled to the collector of Q2 and to G1 of Q21. R29 is also coupled to the base of Q9 which has an emitter coupled to ground and a collector coupled to the base of Q1. R28 is also coupled to the base of Q8 which has an emitter coupled to ground and a collector coupled to R38 and to G3. R27 is also coupled to the collector of Q6 and the base of Q7. The emitter of Q7 is coupled to ground and the collector of Q7 is coupled to one terminal of R35. The other terminal of R35 is coupled to the base of Q12 and to one terminal of R32. The other terminal of R32 is coupled to the collector of Q12, the cathode of D8, and to one terminal of C11. The emitter of Q12 is coupled to one terminal of R56 and of R59. The other terminal of R56 is coupled to G6, and the other terminal of R59 is coupled to node I. The anode of D8 is coupled to line J, and the other terminal of C11 is coupled to node I. MOSFET Q26 has its drain coupled to the positive bus line F and its source coupled to node I. MOSFET Q23 has its drain coupled to node I and its source coupled via R39 to ground.

Line B, which carries signal $e_2$, is coupled to resistors R21-R23 and R37 to effect the state of gates G1, G2, G4, and G5. R37 is also coupled to the collector of Q5 and to G2 of Q22. R23 is also coupled to the base of Q3 which has an emitter coupled to ground and a collector coupled to the base of Q4. R22 is also coupled to the base of Q2 which has an emitter coupled to ground and a collector coupled to R36 and to G1. R21 is also coupled to the collector of Q9 and the base of Q1. The emitter of 17 is coupled to ground and the collector of Q1 is coupled to one terminal of R33. The other terminal of R33 is coupled to the base of Q10 and to one terminal of R30. The other terminal of R30 is coupled to the collector of Q10, the cathode of D6, and to a terminal of C9. The emitter of Q10 is coupled to one terminal of R54 and of R57. The other terminal of R54 is coupled to G4, and the other terminal of R57 is coupled to node G. The anode of D6 is coupled to line J, and the other terminal of C9 is coupled to node G. MOSFET Q24 has its drain coupled to the positive bus line F and its source coupled to node G. MOSFET Q21 has its drain coupled to node G and its source coupled via R39 to ground.

Line C, which carries signal $e_3$, is coupled to resistors R24-R26 and R38 to effect the state of gates G2, G3, G5, and G6. R38 is also coupled to the collector of Q8 and to G3 of Q23. R26 is also coupled to the base of Q6 which has an emitter coupled to ground and a collector coupled to the base of Q7. R25 is also coupled to the base of Q5 which has an emitter coupled to ground and a collector coupled to R37 and to G2. R24 is also coupled to the collector of Q3 and the base of Q4. The emitter of Q4 is coupled to ground and the collector of Q4 is coupled to one terminal of R34. The other terminal of R34 is coupled to the base of Q11 and to one terminal of R31. The other terminal of R31 is coupled to the collector of Q11, the cathode of D7, and to a terminal of C10. The emitter of Q11 is coupled to one terminal of R55 and of R58. The other terminal of R55 is coupled to G5, and the other terminal of R58 is coupled to node H. The anode of D7 is coupled to line J, and the other terminal of C10 is coupled to node H. MOSFET Q25 has its drain coupled to the positive bus line F and its source coupled to node H. MOSFET Q23 has its drain coupled to node H and its source coupled via R39 to ground.

Low voltage cut-off circuit 56 is coupled to power regulating circuit 64 at nodes L and A, and to quad NAND gates 50 at pin 2. Circuit 56 comprises resistors R50-R53, capacitor C16, diode D11, Zener diode D10, NPN transistors Q30-Q31, and jumper 58 in the 24 V configuration. One terminal of R50 is coupled to node L and the other terminal is coupled to the cathode of Zener D10 and R51. In the 24 V configuration, jumper 58 couples R51 to ground, but R51 is unattached in the 12 V configuration which effectively eliminates R51 from the active circuitry. The anode of D10 is coupled to the base of Q30 and one terminal of R52. The other terminal of R52 and the emitter of Q30 are coupled to ground, while the collector of Q30 is coupled to one terminal of R53 and the base of Q31. The other terminal of R53 and the collector of Q31 are coupled to node A, while the emitter of Q31 is connected to the anode of D11 and one terminal of C16. The cathode of D11 is coupled to pin 2 of quad NAND gates 50 for de-activating inverter 12. The other terminal of C16 is coupled to ground, with the value of C16 determining the duration of the shut off time period.

To eliminate time delays in starting inverter 12 upon the switching of cold control 26, charging circuit 68 is provided for quickly charging capacitor C6 and activating pin 6 of quad NAND gates 50. Charging circuit 68 comprises resistors R8, R10, and R43; capacitor C8; and transistor Q15. Q15 has an emitter coupled via line A to signal bus 66, a base coupled to one terminal of R43 and R8, and a collector coupled to one terminal of R10. The other terminal of R43 is coupled to line A and the other terminal of R8 is coupled via C8 to ground. The other terminal of R10 is coupled to one terminal of R9, one terminal of C6, the anode of D5, and pin 6 of quad NAND gates 50. The other terminal of R9 is coupled to line A while the other terminal of C6 is coupled to ground. The cathode of D5 is coupled to pin 3 of quad NAND gates 50.

De-energizing transistors 36 comprise NPN transistors Q16-Q18 and resistors R60-R62. R60-R62 have one terminal coupled to pin 4 of quad NAND gates 50 and the other terminal coupled to the base of Q16-Q18, respectively. Q16-Q18 have emitters coupled to ground and collectors coupled to G1-G4, respectively.

Figure 8A:
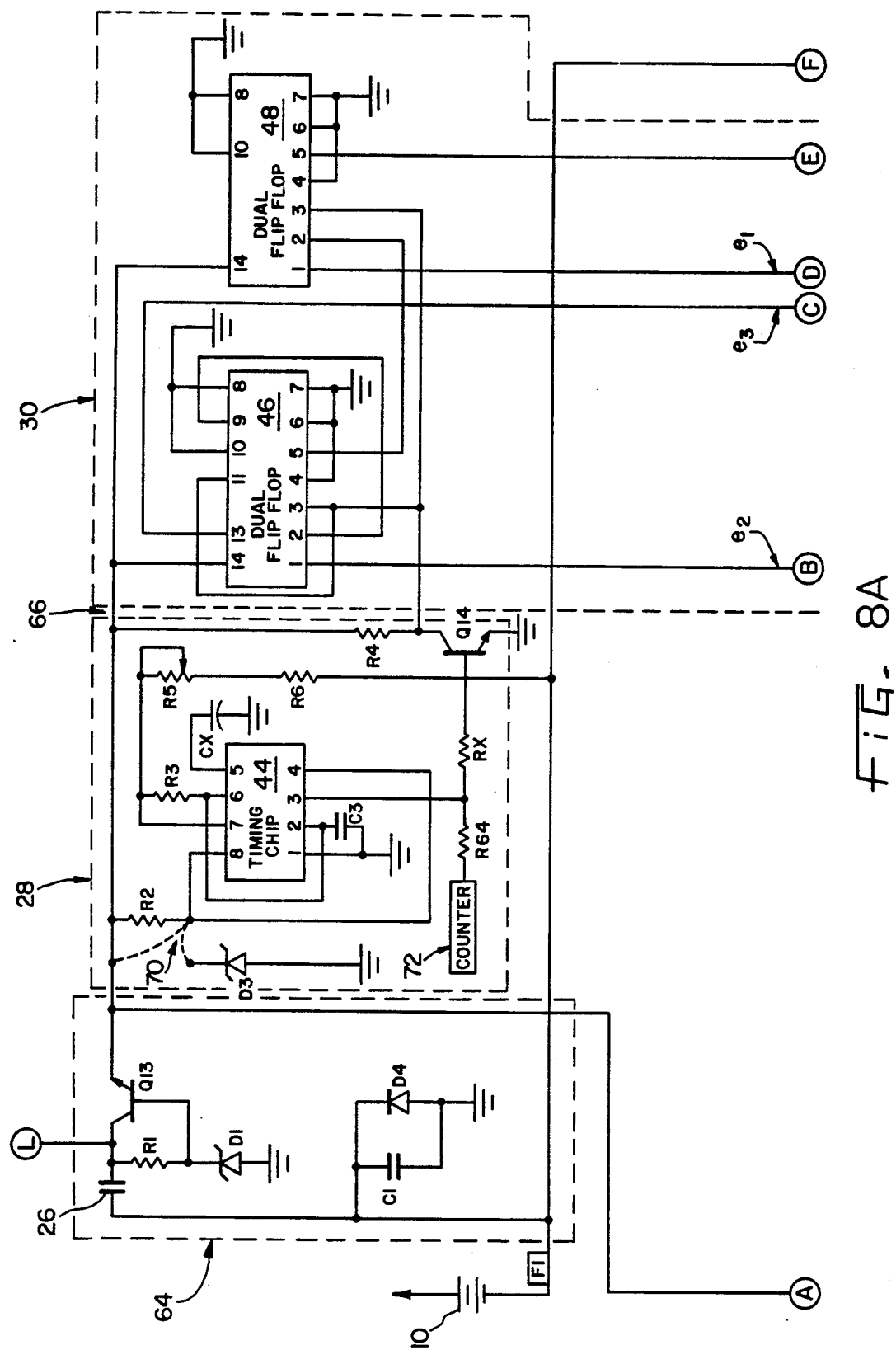
FIGS. 8A, 8B, and 8C are circuit diagrams of a second embodiment of the inverter of the present invention.
Figure 8B:
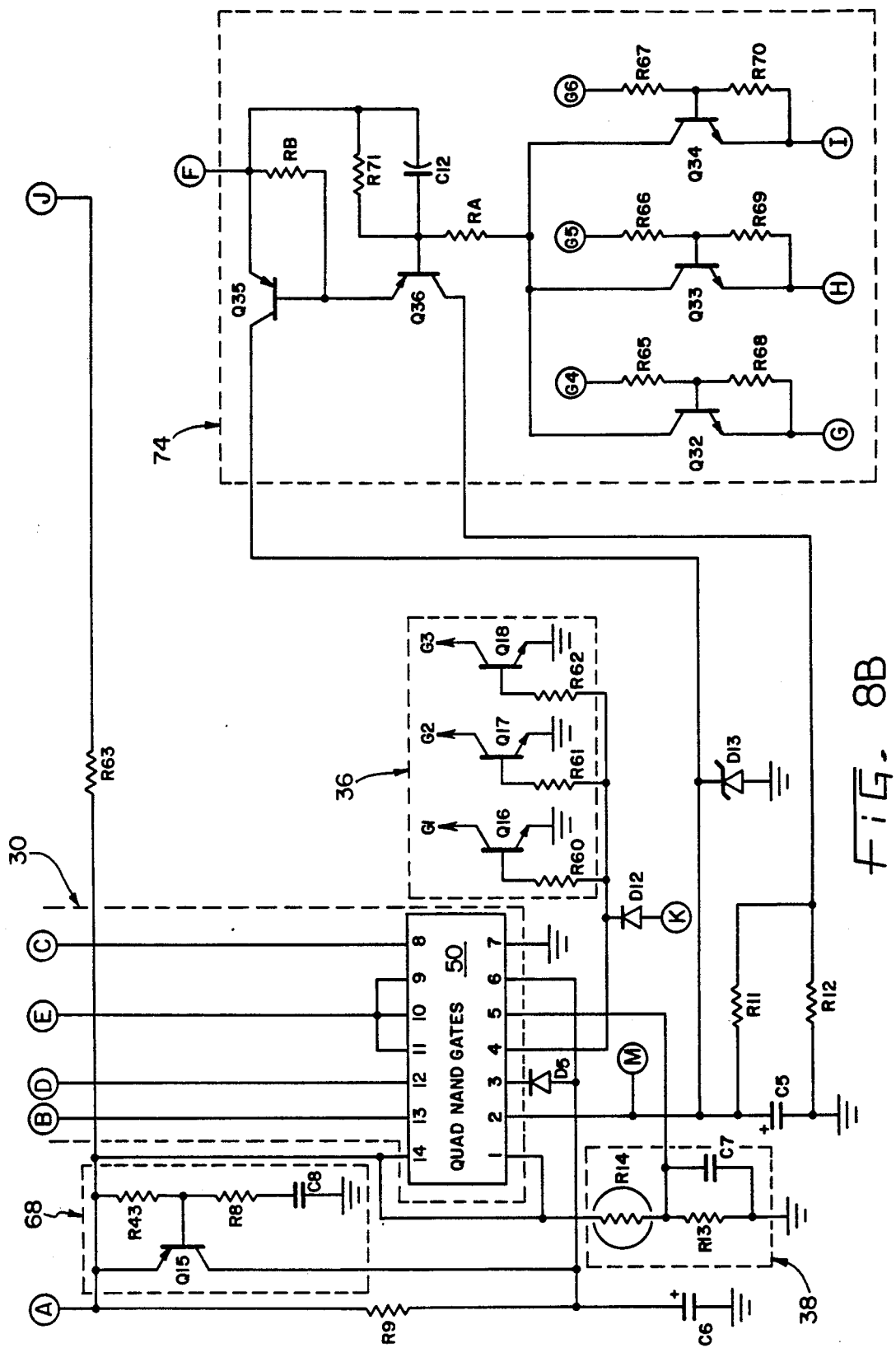
Figure 8C:
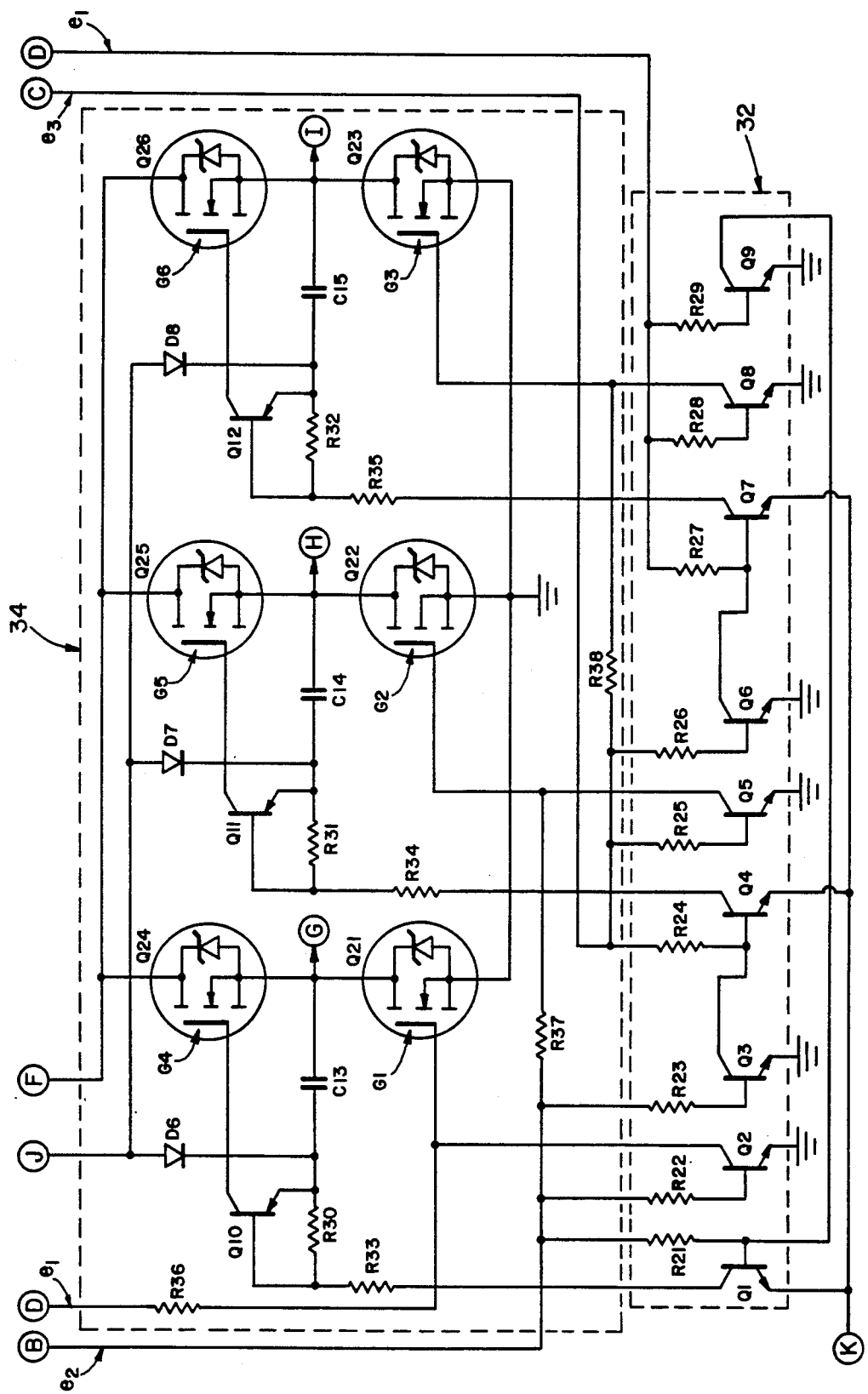

The circuitry of a second embodiment of inverter 12 of the present invention is shown in detail in the circuit diagrams of FIGS. 8A, 8B, and 8C. The second embodiment of the inverter is similar to the first embodiment as described above, and accordingly a description of the similarly referenced elements of FIGS. 8A-8C is not repeated. However, the differences between the second embodiment circuitry of FIGS. 8A-8C and the first embodiment circuitry of FIGS. 1A-1C are discussed below.

Protection circuit 74 is depicted in FIG. 8B, and replaces overload circuit 40 and locked rotor circuit 42 of the first embodiment. Protection circuit 74 detects when the current supplied by inverter 24 exceeds the normal run current for more than a predetermined amount of time, thus indicating a locked rotor or overload current condition. Transistors Q32, Q33, and Q34 of protection circuit 74 have their emitters connected to node G, node H, and node I, respectively. The base of each of Q32-Q34 is connected to a voltage divider circuit including two resistors coupled in series between one of the gates G4-G6 of a driving transistor and one of the nodes G, H, and I. For example, one terminal of R65 is coupled to G4 and the other terminal of R65 is coupled to the base of Q32 and to one terminal of R68. The other terminal of R68 is coupled to node G and the emitter of Q32. Resistors R66 and R69 are similarly disposed in relation to G5, Q33, and node H, as resistors R67 and R70 are similarly disposed in relation to G6, Q34, and node I. The collectors of Q32-Q34 are all coupled to one terminal of resistor RA which has its other terminal coupled to the remainder of protection circuit 74, particularly transistors Q35 and Q36.

Transistors Q35 and Q36 are coupled to inputs of pin 2 of quad NAND gates 50. The collector of Q35 is directly coupled to the cathode of Zener diode D13 and pin 2 of quad NAND gates 50. The collector of Q36 is coupled to pin 2 of quad NAND gates 50 through R11, and the collector of Q36 is also coupled to ground through R12. Q35 and Q36 are coupled to Q32-Q34 through RA, wherein the base of Q36 is coupled to the other terminal of RA and the emitter of Q35 is coupled to the other terminal of RA through the parallel circuit of R71 and C12. Q35 and Q36 are also coupled to positive bus line F, wherein the emitter of Q35 is coupled to line F, the base of Q35 and the emitter of Q36 are coupled through resistor RB to line F, and the base of Q36 is coupled through the parallel circuit of R71 and C12 to line F.

Another modification in the second embodiment involves the direct connection of the source of each power transistor Q21-Q23 to ground, wherein the sense resistor R39 of the first embodiment has been eliminated as it is no longer needed. A further modification in the second embodiment involves the emitters of Q1, Q4, and Q7 which are coupled to the anode of diode D12 which has its cathode coupled to pin 4 of quad NAND gates 50.

Other modifications include the removal of jumpers 52 and 54, and the addition of jumper 70. Jumper 70 may be connected in two arrangements: a 12 volt arrangement wherein jumper 70 couples pin 8 of timing chip 44 to the cathode of grounded Zener couples pin 8 of timing chip 44 to the cathode of grounded Zener diode D3; and a 24 volt arrangement wherein jumper 70 couples pin 8 directly to signal bus 66 thus physically removing D3 from the circuit and effectively removing R2 from the active circuit. In the 24 V arrangement, D1 and Q13 provide the desired voltage regulation on signal bus 66, while in the 12 V arrangement D3 provides the regulation.

Further, counter 72 may be coupled to one terminal of R64 which has a second terminal coupled to pin 3 of timing chip 44 and to Rx. Counter 72 is optionally included for diagnostic purposes, and is not necessary for the practice of the present invention.

Also, charging circuit 68 is modified in the second embodiment by the removal of R10, and R63 is added adjacent to charging circuit 68. One terminal of R63 is coupled to charging circuit 68 and pin 14 of quad NAND gates 50, while the other terminal of R63 is coupled to line J. R63 aids in reducing any ripple voltages on line J.

Further changes in the second embodiment involve the arrangement of power transistors 34. Resistors R54-R59 are removed thus directly coupling G4, G5, and G6 to the collectors of Q10-Q12, respectively, and to the first terminals of R65-R67, respectively. Capacitors C9-C11 are replaced by capacitors C13-C15 which are disposed in the same relative location but have different capacitances.

The second embodiment operates similarly to the first embodiment for most conditions, but differs in its operation during a locked rotor or overload current condition. When G4 is driven positive relative to node G then transistor Q32 turns on and allows the emitter-base junctions of Q35 and Q36 to be driven by voltage across the drain-source of Q24 which is when Q24 is conductive.

The resistance of RA turns on Q36 when a current exceeding run current exists, indicating a locked rotor condition, thereby causing C5 to charge through R11. R11 and C5 are provided with predetermined capabilities to cause pin 2 of quad NAND gates 50 to shut off the inverter after a predetermined time period of about two seconds, which is sufficient to allow a normal compressor startup. During the predetermined time period before shut off, inverter 12 supplies power to motor-compressor 14 at full voltage without current limitation.

In the case of the occurrence of overload current, for example when the output terminals are shorted together or shorted to ground, the voltage drop across Q24 becomes high enough to turn on Q35. Q35 has a collector coupled directly to pin 2 of NAND gates 50 so that when Q35 is conductive, C5 is quickly charged and causes the inverter to be turned off before power transistors 32 may be damaged. Transistors Q33 and Q34 are similarly coupled with transistors Q25-Q26 to detect the locked rotor and overload current conditions, protecting against drainage excessive drainage by battery 10 and protecting the output terminals of power transistors 34 from shorting together.

When the voltage apparent at pin 2 of quad NAND gates 50 is driven above its threshold, pin 3 drops to low and pin 4 goes high. The emitters of Q1, Q4, and Q7 are coupled to the anode of diode D12, with the cathode of D12 being coupled to pin 4 of quad NAND gates 50. Pin 4 going high causes Q1, Q4, and Q7 to turn off which results in Q10, Q11, and Q12 turning off and thus opening power transistors Q24-Q26. Also, the high voltage apparent at pin 4 causes transistors Q16-Q18 to be activated and turn off power transistors Q21-23. Therefore, all six power 30 transistors Q21-26 are simultaneously deactivated in response to the locked rotor condition or the overload current condition.

One advantage of protection circuit 74 involves the circuits of R65 & R68, R66 & R69, and R67 & R70 which perform the dual function of driving Q32, Q33, and Q34, respectively, and of providing a turn-off or leakage path for dissipating charges on gates G4, G5, and G6. A further advantage of protection circuit 74 is that the circuit's sense points may include circuit board runners (not shown), and thus a greater voltage drop for sensing may be obtained without having additional power loss or component cost.

The present invention may be practiced by using the following values for the circuit elements described above:

| Label | Value |
| --- | --- |
| R1 | 1.0 KΩ |
| R2 | 1.0 KΩ |
| R3 | 4.7 KΩ |
| R4 | 4.7 KΩ |
| R5 | 100 KΩ trim potentiometer |
| R6 | 75 KΩ |
| R8 | 4.7 KΩ |
| R9 | 1.5 MΩ |
| R11 | 51 KΩ |
| R12 | 220 KΩ |
| R13 | 100 KΩ |
| R14 | PTC Thermistor |
| R21–29 | 18 KΩ |
| R30–32 | 2.7 KΩ |
| R33–35 | 33 KΩ |
| R36 | 2.7 KΩ |
| R37 | 2.7 KΩ |
| R38 | 2.7 KΩ |
| R43 | 33 KΩ |
| R50–53 | 33 KΩ |
| R60–62 | 75 KΩ |
| R63 | 0.2 KΩ |
| R64 | 10 KΩ |
| R65–67 | 2.7 KΩ |
| R68–70 | 0.39 KΩ |
| R71 | 10 KΩ |
| RA,RB | 0.39 KΩ |
| Rx | 10 KΩ |
| C1 | 470 μf, 35 V |
| C3 | 0.1 μf |
| C5 | 6.8 μf, 25 V |
| C6 | 6.8 μf, 25 V |
| C7 | 0.1 μf |
| C8 | 2.2 μf, 15 V |
| C9–11 | 68 μf, 25 V |
| C12 | 0.1 μf |
| C13–15 | 47 μf, 25 V |
| C16 | 47 μf, 15 V |
| Cx | 0.1 μf |
| D1 | 15 V, 1 w Zener |
| D3 | 6.2 V 0.5 w Zener |
| D4 | MR751 |
| D5 | 1N4001 |
| D6–8 | 1N4001 |
| D10 | 6.2 V, 0.5 w Zener |
| D11 | 1N4001 |
| D12 | 1N4001 |
| D13 | 15 V, 1 w Zener |
| Q1–9 | 2N3904 |
| Q10–12 | MPS4126 |
| Q13 | TIP 29 |
| Q14 | 2N3904 |
| Q15 | MPS4126 |
| Q16–18 | 2N3904 |
| Q19 | MPS4126 |
| Q20 | MPS4126 |
| Q21–23 | MPT50N05E |
| Q24–26 | MPT50N05E |
| Q30–Q34 | 2N3904 |
| Q35,Q36 | 2N4403 |

It should be understood that the signals generated by the circuitry of the present invention may take many forms, such as voltage levels as disclosed, logic levels, polarity, current levels, etc.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A refrigerator adapted to be connected to a source of DC voltage, said refrigerator comprising:
   a housing;
   a compressor disposed within said housing;
   a motor operably connected to said compressor; and
   inverter means for driving said motor, said inverter means adapted to be coupled to the DC voltage source and including means for generating a multiple phase AC output from the DC voltage source and means for providing said multiple phase AC output to said motor, said inverter means further including timing means for regulating the frequency of said generating means, said timing means causing said multiple phase AC output to be at a frequency which is proportional to the voltage level of the DC voltage source, said generating means being responsive to said timing means so that changes in the voltage level of the DC voltage source change the frequency of said multiple phase AC output, said inverter means further including means for minimizing the time delay in starting operation of said inverter when DC voltage is supplied.

2. The refrigerator of claim 1 wherein said motor includes three windings adapted to be arranged in one of a wye configuration and a delta configuration, said inverter means is adapted to drive said three windings arranged in said wye configuration when the DC voltage source provides a first predetermined voltage level, and said inverter means is adapted to drive said three windings arranged in said delta configuration when the DC voltage source provides a second predetermined voltage level.

3. The refrigerator of claim 1 wherein said inverter means includes means for detecting current exceeding run current and allowing said inverter means to supply said motor with power at full voltage without current limitation for a predetermined time period, said current detecting means shutting down said inverter means if current exceeding run current is detected for longer than said predetermined time period whereby a locked rotor condition is detected.

4. The refrigerator of claim 1 wherein said inverter means includes means for detecting overload current and de-energizing said inverter means when said overload current is detected.

5. The refrigerator of claim 1 wherein said inverter means includes a protection circuit which de-energizes said inverter means when overload current is detected and which de-energizes said inverter means when current exceeding run current occurs for longer than a predetermined time period.

6. The refrigerator of claim 5 wherein said inverter means includes a plurality of power transistors, said protection circuit including turn-off means for turning off said power transistors, said turn-off means responsive to said protecting circuit and arranged to turn off each of said power transistors when said protection circuit de-energizes said inverter means.

7. The refrigerator of claim 6 wherein said protection circuit is coupled to said power transistors and provides voltage signals which are proportional to the current in said power transistors.

8. The refrigerator of claim 7 further comprising gating means for de-energizing said inverter means, said gating means receiving said voltage signals from said protection circuit and de-energizing said inverter means when the detected current exceeds run current for longer than a predetermined time period.

9. The refrigerator of claim 8 wherein said gating means de-energizes said inverter means when the detected current is an overload current.

10. The refrigerator of claim 6 wherein said protection circuit is coupled to gates of a portion of said power transistors and said turn-off means provides a turn-off path for the gates of said portion of said power transistors.

11. The refrigerator of claim 1 wherein said inverter means includes a timer and a multiple phase wave generator.

12. The portable refrigerator of claim 1 further comprising cut off means for stopping said inverter means when said cut off means determines that the DC voltage source falls below a predetermined voltage.

13. The refrigerator of claim 12 wherein said cut off means includes means for automatically reactivating said inverter means.

14. The refrigerator of claim 13 wherein said cut off means includes a timer for activating said automatically reactivating means of said inverter periodically after predetermined intervals of time.

15. The refrigerator of claim 1 wherein said inverter means includes a plurality of power transistors and means for driving said power transistors, said driving means coupled to said generating means.

16. The refrigerator of claim 15 wherein said generating means produces a plurality of signals, and said driving means includes means for decoding said signals and selectively actuating said power transistors.

17. A refrigerator adapted to be connected either to a first source of DC voltage which provides a first voltage, or to a second source of DC voltage which provides a second voltage, said refrigerator comprising:
a compressor;
a motor operably connected to said compressor, said motor including three windings capable of being arranged in a delta or a wye configuration; and
inverter means for driving said motor, said inverter means adapted to be coupled either to the first or second DC voltage source and including means for generating a multiple phase AC output from the coupled DC voltage source and means for regulating said multiple phase AC output to said windings, said inverter means including means for converting said inverter means between first and second arrangements, said converting means includes a power regulating circuit for providing power to said first arrangement of said inverter means when said inverter means is coupled to the first DC voltage source and said motor is arranged in said delta configuration, said power regulating circuit also for providing power to said second arrangement of said inverter means when said inverter means is coupled to the second DC voltage source and said motor is arranged in said wye configuration;
said power regulating circuit including first voltage control means for controlling the voltage supplied to said first arrangement, said first voltage control means including first clipping means for limiting the voltage supplied to said inverter means to a first predetermined voltage level and resistance means for limiting the amount of power delivered to said generating means;
said power regulating circuit including second storage control means for controlling the voltage supplied to said second arrangement, said second voltage control means being removably connected to said power regulating circuit and including second clipping means for limiting the voltage supplied to said inverter means to a second predetermined voltage level and means for disconnecting said resistance means from said power regulating circuit.

18. The refrigerator of claim 17 wherein said inverter means includes a sensor wire, said converting means includes means for changing said sensor wire from a first resistance in said first arrangement of said inverter means to a second resistance in said second arrangement of said inverter means.

19. The refrigerator of claim 17 wherein said converting means includes jumpers which are selectively coupled within said inverter for forming said first and second arrangements.

20. The refrigerator of claim 17 wherein said inverter means includes means for detecting a current exceeding run current and allowing said inverter means to supply said motor with power at full voltage without current limitation for a predetermined time period, said current detecting means shutting down said inverter means if current exceeding run current is detected for longer than said predetermined time period whereby a locked rotor condition is detected.

21. The refrigerator of claim 17 wherein said inverter means includes means for detecting overload current and de-energizing said inverter means when said overload current is detected.

22. The refrigerator of claim 17 wherein said inverter means includes a protection circuit which de-energizes said inverter means when overload current is detected and which de-energizes said inverter means when current exceeding run current occurs for longer than a predetermined time period.

23. The refrigerator of claim 22 wherein said inverter means includes a plurality of power transistors, said protection circuit including turn-off means for turning off said power transistors, said turn-off means responsive to said protection circuit and arranged to turn off each of said power transistors when said protection circuit de-energizes said inverter means.

24. The refrigerator of claim 22 wherein said protection circuit is coupled to said power transistors and provides voltage signals which are proportional to the current in said power transistors.

25. The refrigerator of claim 24 further comprising gating means for de-energizing said inverter means, said gating means receiving said voltage signals from said protection circuit and de-energizing said inverter means when the detected current exceeds run current for longer than a predetermined time period.

26. The refrigerator of claim 25 wherein said gating means de-energizes said inverter means when the detected current is an overload current.

27. The refrigerator of claim 20 wherein said protection circuit is coupled to gates of a portion of said power transistors and said turn-off means provides a turn-off path for the gates of said portion of said power transistors.

28. A refrigerator comprising:
a housing;
a compressor disposed within said housing;
a motor operably connected to said compressor;
a power supply means for providing DC voltage;
inverter means for receiving said DC voltage and driving said motor, said inverter means including means for generating a multiple phase AC output from said DC voltage and means for providing said multiple phase AC output to said motor, said inverter means further including timing means for regulating the frequency of said generating means, said timing means causing said multiple phase AC output to be at a frequency which is proportional to the voltage level of said DC voltage, said generating means being responsive to said timing means so that changes in the voltage level of said power supply means change the frequency of said multiple phase AC output; and
cut off means for stopping said inverter when said cut off means determines that said DC voltage falls below a predetermined voltage, said cut off means including a Zener diode having a predetermined voltage threshold, a switching means connected to said Zener diode, and a means for de-energizing said multiple phase AC output providing means, said Zener diode being coupled to said power supply means, said power supply means normally providing a DC voltage which exceeds said predetermined voltage threshold of said Zener diode, said switching means being triggered by an absence of voltage apparent at said Zener diode and activating said de-energizing means when said DC voltage falls below said predetermined threshold to thereby turn off said inverter means.

29. The refrigerator of claim 28 wherein said generating means generates a six-step drive waveform to provide a three-phase AC output voltage.

30. The refrigerator of claim 28 wherein said motor includes three windings adapted to be arranged in one of a wye configuration and a delta configuration, said inverter means is adapted to drive said three windings arranged in said wye configuration when said power supply means provides said DC voltage at a first predetermined voltage level, and said inverter means is adapted to drive said three windings arranged in said delta configuration when said power supply means provides DC voltage at a second predetermined voltage level.

31. The refrigerator of claim 28 wherein said cut off means includes means for automatically reactivating said inverter.

32. The refrigerator of claim 28 wherein said power supply comprises a battery.

33. The refrigerator of claim 28 wherein said inverter means includes means for detecting a current exceeding run current and allowing said inverter means to supply said motor with power at full voltage without current limitation for a predetermined time period, said current detecting means shutting down said inverter means if current exceeding run current is detected for longer than said predetermined time period whereby a locked rotor condition is detected.

34. The refrigerator of claim 28 wherein said inverter means includes means for detecting overload current and de-energizing said inverter means when said overload current is detected.

35. The refrigerator of claim 28 wherein said inverter means includes a protection circuit which de-energizes said inverter means when overload current is detected and which de-energizes said inverter means when the current exceeding run current occurs for longer than a predetermined time period.

36. The refrigerator of claim 35 said inverter means includes a plurality of power transistors, said protection circuit including turn-off means for turning off said power transistors, said turn-off means responsive to said protection circuit and arranged to turn off each of said power transistors when said protection circuit de-energizes said inverter means.

37. The refrigerator of claim 36 wherein said protection circuit is coupled to said power transistors and provides voltage signals which are proportional to the current in said power transistors.

38. The refrigerator of claim 37 further comprising gating means for de-energizing said inverter means, said gating means receiving said voltage signals from said protection circuit and de-energizing said inverter means when the detected current exceeds run current for longer than a predetermined time period.

39. The refrigerator of claim 38 wherein said gating means de-energizes said inverter means when the detected current is an overload current.

40. The refrigerator of claim 36 wherein said protection circuit is coupled to gates of a portion of said power transistors and said turn-off means provides a turn-off path for the gates of said portion of said power transistors.

41. The refrigerator of claim 28 wherein said inverter means includes means for minimizing the time delay in starting operation of said inverter means when said DC voltage is supplied.

42. The refrigerator of claim 28 wherein said inverter means includes a plurality of power transistors and means for driving said power transistors, said driving means coupled to said generating means.

43. The refrigerator of claim 42 wherein said generating means produces a plurality of signals, and said driving means includes means for decoding said signals and selectively actuating said power transistors.

* * * * *

UNITED STATES PATENT AND TRADEMARK OFFICE
CERTIFICATE OF CORRECTION

PATENT NO. : 5,262,704
DATED : November 16, 1993
INVENTOR(S) : James B. Farr

It is certified that error appears in the above-identified patent and that said Letters Patent is hereby corrected as shown below:

Claim 17, col. 15, line 61, delete "includes" and insert therefor -- including--.

Claim 17, col. 16, line 12 and 13, delete "storage and insert therefor -- voltage--.

Claim 32, col. 18, line 5, after "supply", first occurrence, insert --means--.

Claim 36, col. 18, line 25, before "said", first occurrence, insert --wherein--.

Signed and Sealed this

Third Day of May, 1994

Attest:

BRUCE LEHMAN

Attesting Officer

Commissioner of Patents and Trademarks